Figure 1:
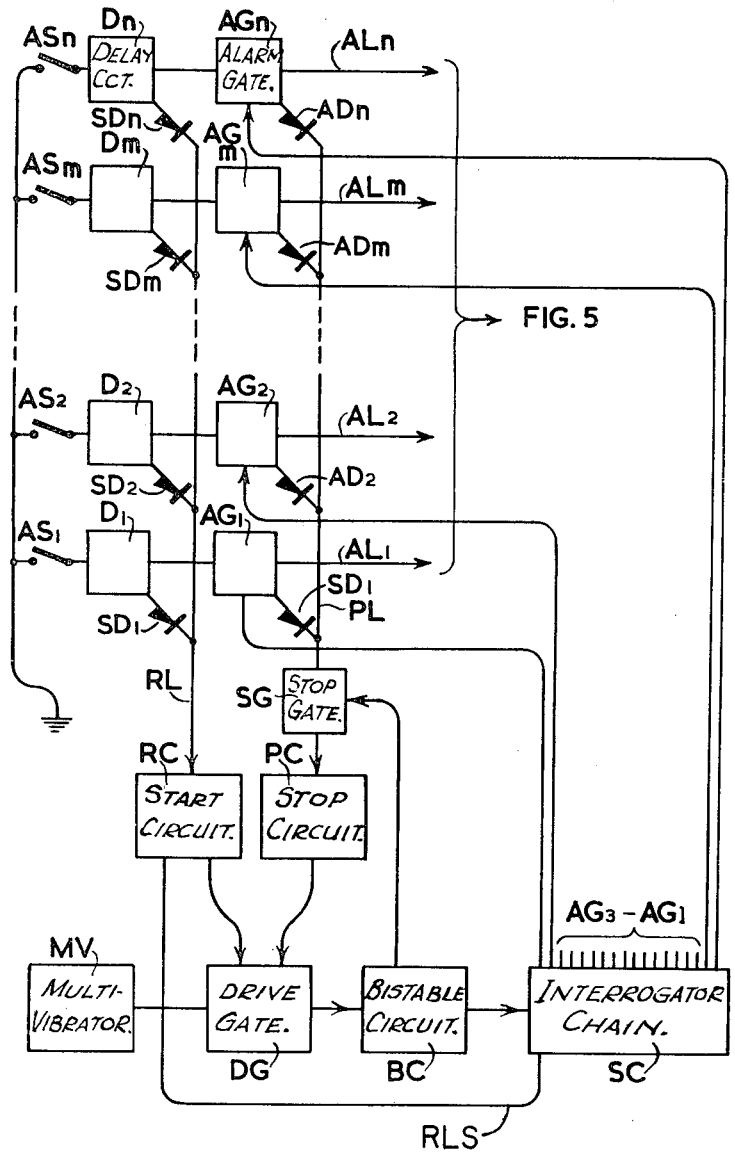

Feb. 8, 1966 J. S. TODMAN 3,234,534
FAULT ALARM DISPLAY SYSTEMS
Filed Nov. 30, 1962 7 Sheets-Sheet 3

INVENTOR
JOHN STANLEY TODMAN
BY Hane and Nydick
ATTORNEYS

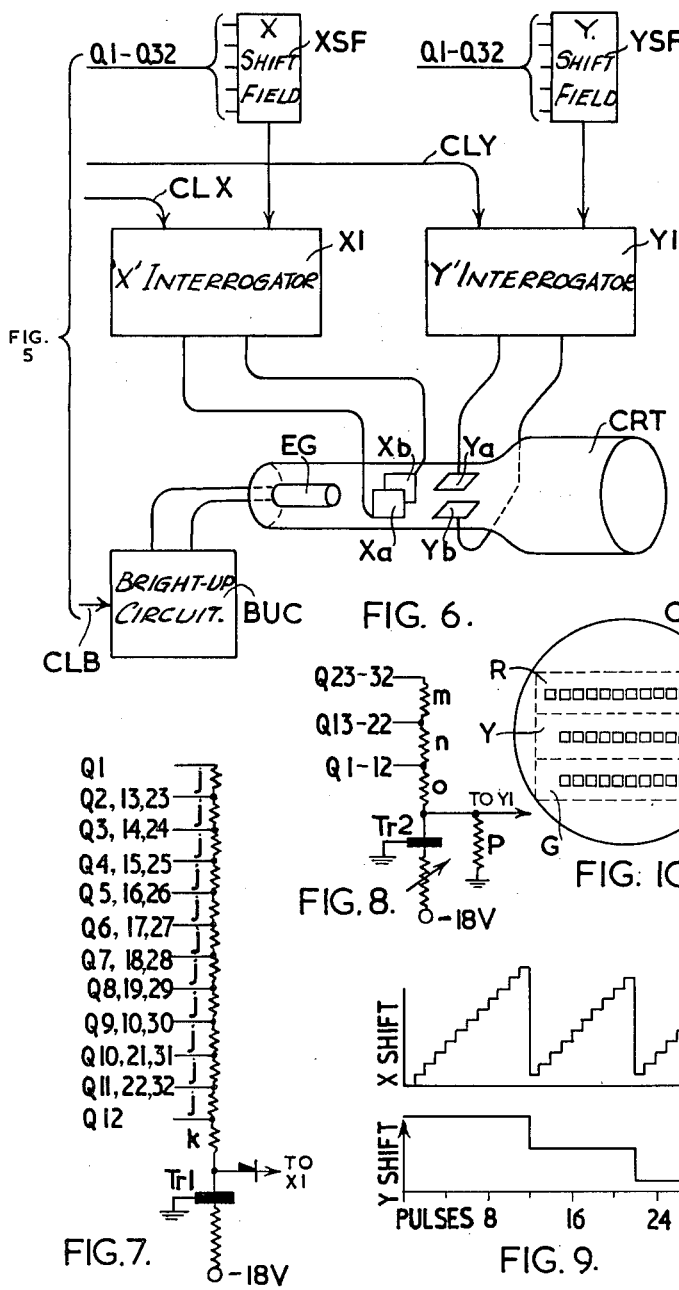

United States Patent Office 3,234,534
Patented Feb. 8, 1966

3,234,534
FAULT ALARM DISPLAY SYSTEMS
John Stanley Todman, Brockley, London, England, assignor to Rank-Bush Murphy Limited
Filed Nov. 30, 1962, Ser. No. 241,438
Claims priority, application Great Britain, Dec. 4, 1961, 43,257/61
6 Claims. (Cl. 340—213)

This invention relates to fault alarm display systems such as may be used, for example, in connection with complex machines, vehicles or aircraft to provide to an operator, driver or pilot a legend indicating that a fault has developed. The present invention is of particular importance in connection with aircraft, where it is most desirable to provide a central alarm display for a number of possible operational failures.

Hitherto the operation of complex machines, vehicles or aircraft has been attended by the difficulty that failures of any of a number of functions may require action of varying degrees of urgency on the part of the operator, driver or pilot in response to alarm signals displayed optically. The more complex the machine the more difficult it has been to ensure that the displays initiated by failures of like urgency are brought with equal rapidity to the notice of the operator.

According to the present invention there is provided fault alarm display apparatus comprising interrogation means, of which the operation is initiated by the occurrence of any fault to be indicated, for interrogating a series of circuits in which a predetermined condition indicates a fault and in response to the occurrence of said predetermined condition in any of said circuits to cause an appropriate unique display to be produced on the screen of a single cathode ray tube in the form of one or more linear traces.

Preferably the displays produced by each of two simultaneously occurent faults are displayed in rotation as long as the initiating faults persist.

It will usually be most advantageous to provide displays in the form of appropriate wording, but it is of course within the scope of the invention to display symbolic devices as linear traces upon the screen of the cathode ray tube.

In cases where the degree of urgency of a failure is well defined it is advantageous to provide a cathode ray tube having a phosphor screen of which discrete areas luminesce in different colors and to cause the displays pertaining to different faults to appear on areas of appropriate color. Specifically, those faults requiring immediate action by the operator may be arranged to produce a display on a red-luminescent part of the screen, those faults requiring less urgent action may appear on an amber-luminescent screen portion and those faults which do not require action to be taken at the time may appear on a green-luminescent part of the screen.

Figure 2:
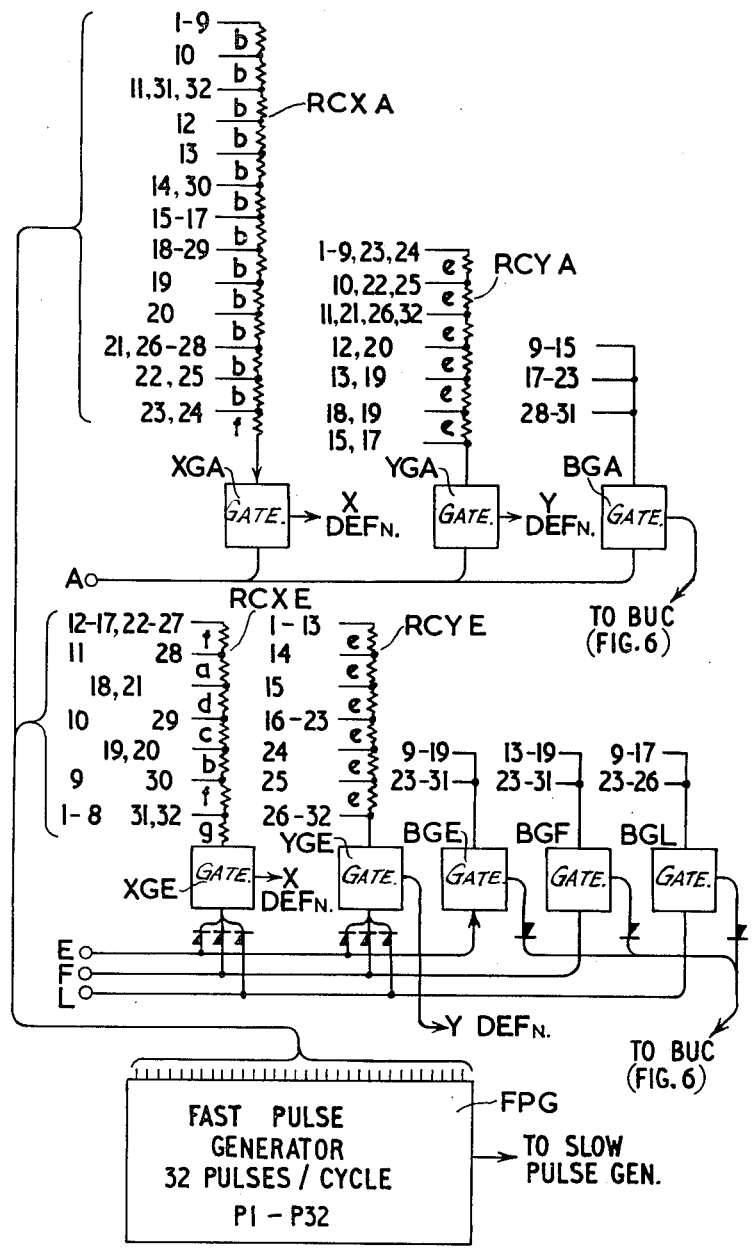
Figure 3:
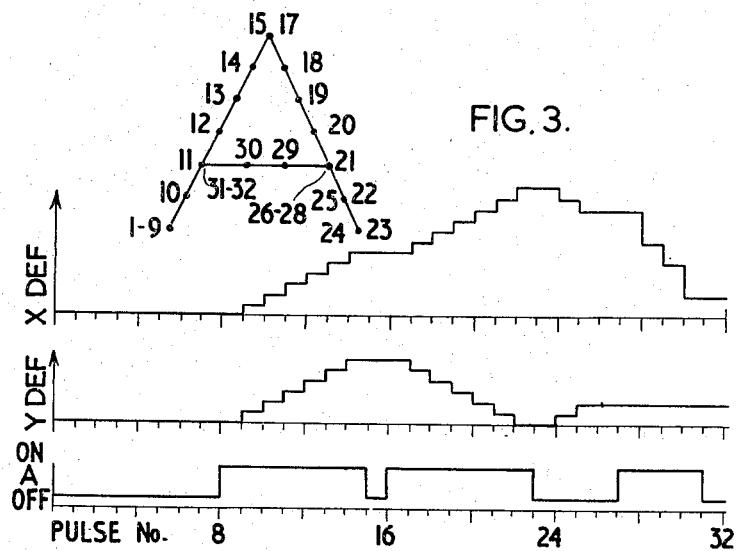
Figure 4:
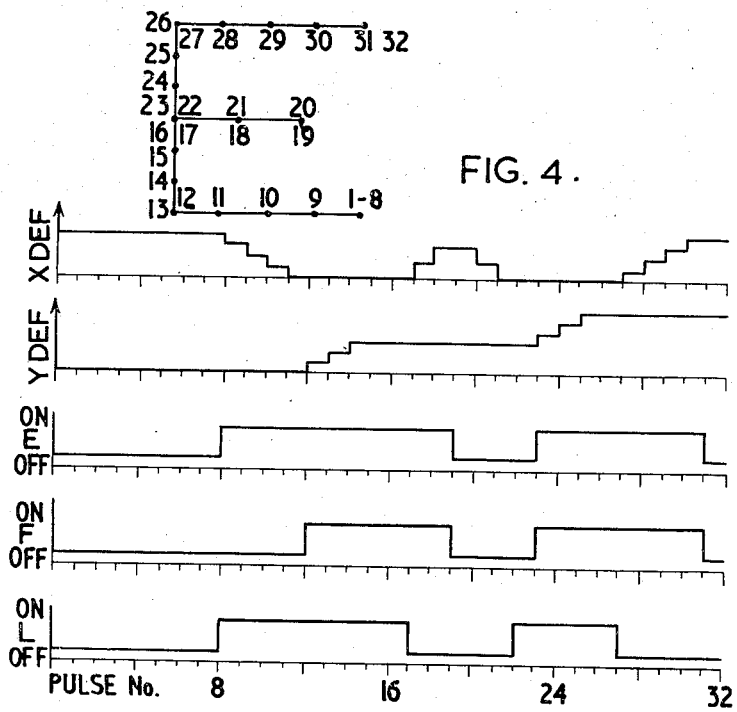
Figure 5:
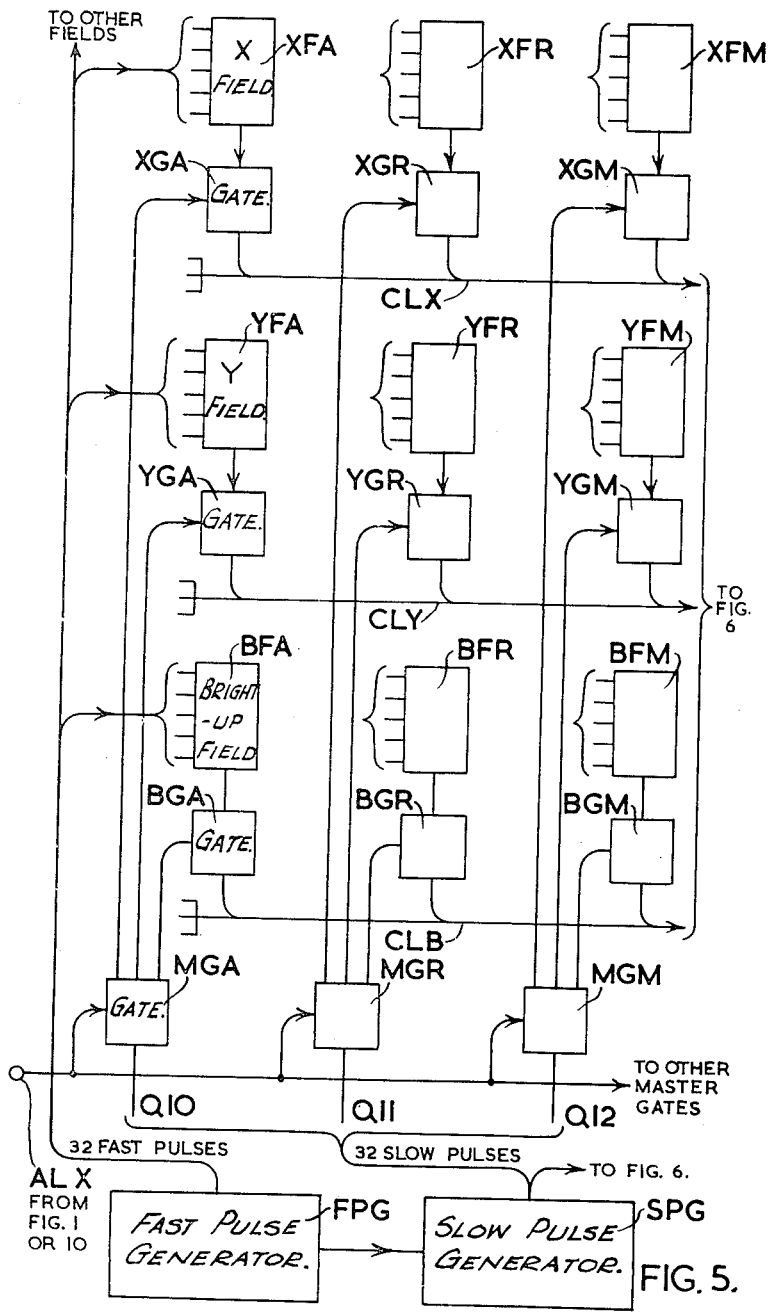
Figure 11:
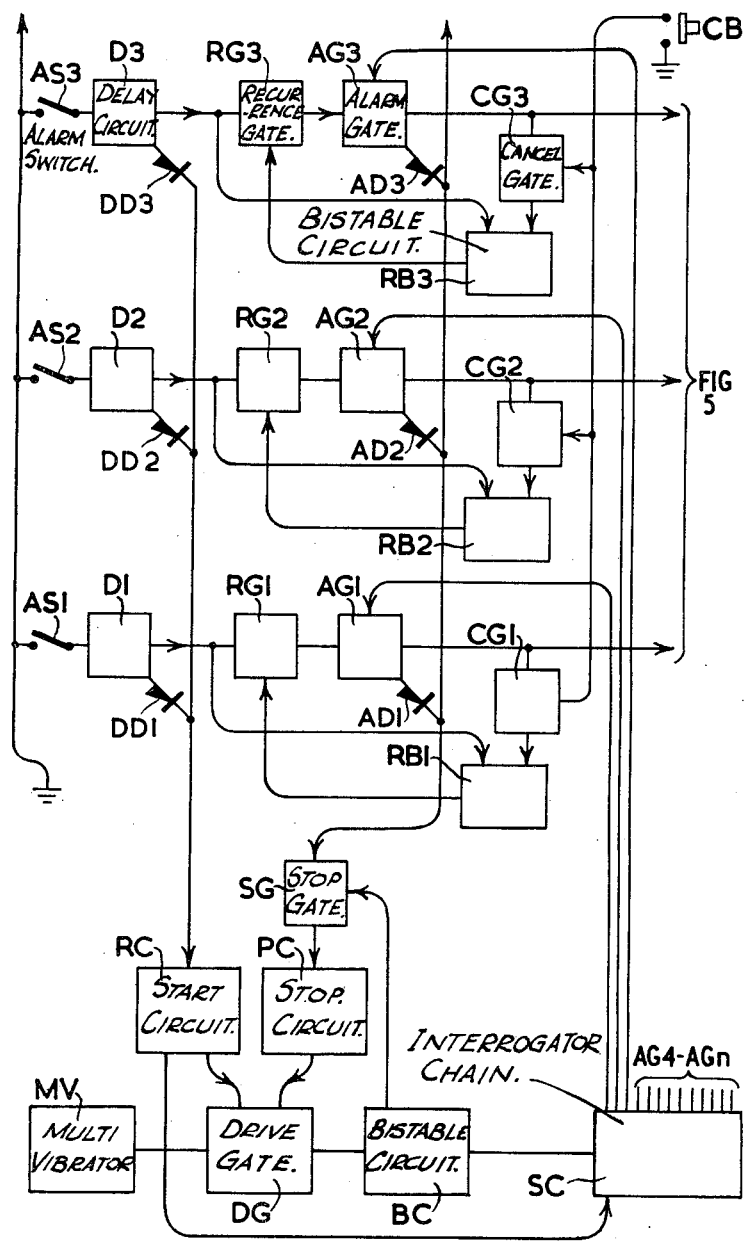
Figure 12:
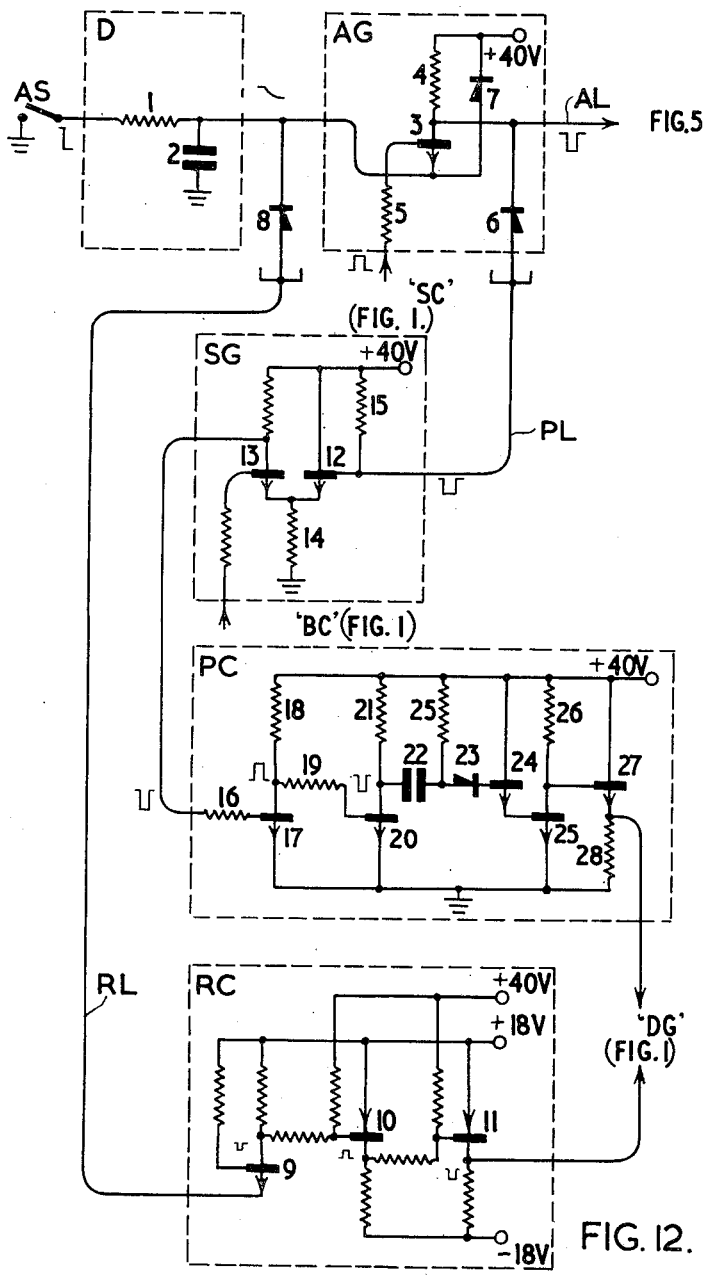

Embodiments of the invention suitable for use in an aircraft to provide warning to the pilot of various operational failures will now be described in some detail with reference to the accompanying drawings, comprising FIGURES 1 to 12, of which:

FIGURE 1 is a schematic diagram of part of an alarm display system according to the present invention, FIGURE 2 is a diagram explaining the production of required voltage sequences, FIGURES 3 and 4 show how voltage sequences generated as described in relation to FIGURE 3 can be used to generate symbols, FIGURE 5 is a schematic diagram of a further part of the system, FIGURE 6 is a schematic diagram of another part of the system, FIGURES 7 and 8 illustrate parts of the apparatus of FIGURE 6, FIGURE 9 contains voltage diagrams illustrating the operation of the circuits of FIGURES 7 and 8, FIGURE 10 is a diagram explaining the form of display produced, FIGURE 11 is a schematic diagram showing an alternative arrangement for the apparatus described in relation to FIGURE 1, and FIGURE 12 contains circuit diagrams of some of the elements of FIGURE 1.

In FIGURE 1 it is assumed that the closure of each of a plurality of alarm switches $AS1$, $AS2$ . . . $ASm$, $ASn$ is produced by the occurrence of a specific fault condition, and that the closure of any such switch initiates the operation of an associated delay circuit $D1$, $D2$ . . . $Dm$, $Dn$. Provided that the fault indication is rescinded within a suitable period, the triggered delay circuit will return to its quiescent condition without producing any output, thus providing some discrimination against incorrect fault indications due for example to vibration. Provided that the fault indication persists, the actuated delay circuit provides two outputs. One of these outputs passes directly to the associated one of a like plurality of alarm gates, $AG1$, $AG2$ . . . $AGm$, $AGn$, and the other output passes through an associated diode $SD1$ . . . $SDn$ to a start line common to all the delay circuits. The output fed by the actuated delay circuit into the start line triggers a starting circuit RC. In its quiescent condition, that is, when none of the alarm switches are closed, starting circuit RC provides a reset output to an interrogator chain SC, the function of which will be described below. When actuated by a signal from the start line, starting circuit RC provides an output to a drive gate DG, which it opens to allow signals from a multivibrator MV to pass to a bistable circuit BC. In one of its stable conditions bistable circuit BC provides an output pulse for an interrogator chain SC, which is a ring counter having as many stages as the number of alarm gates, in the present case $n$ stages. Thus so far the circuit operation produced by the closure of an alarm switch is to cause the interrogator chain to commence counting from the first position into which it is reset by the reset pulse from the starting circuit RC.

When actuated, each stage of the interrogator chain SC provides to an associated one of alarm gates $AG1$–$AGn$ an output which opens the gate. When opened, any alarm gate provides two outputs, one of which is used, as will later be described, to control the production of an appropriate display, while the other passes by way of an associated diode $SD1$ . . . $SDn$ to a stop line common to all the alarm gates. The signal thus fed into the stop line by the actuated alarm gate passes to a stop gate SG which is also controlled by an output pulse developed by bistable circuit BC when in that condition in which it does not provide a drive pulse for the scanner chain. When both inputs are applied to stop gate SG it provides an output signal to a stop circuit PC, which provides to an inhibiting input on drive gate DG a signal which persists for a period suitable to the time necessary for a display to be produced. In the present case a waiting period of three seconds is employed. During this period the remaining output from the actuated alarm gate, which it will be convenient to assume is $AGn$, controls the operation of the display equipment in a manner described below. At the end of this period the stop circuit PC removes the inhibiting bias from the drive gate DG and the scanner chain is again driven by pulses from the bistable circuit BC. Provided that the fault persists, the scanner chain SC will be stopped for a period of three seconds each time it actuates alarm gate AG*n*. If other faults also arise, then the scanner chain will stop at each of these also, and an appropriate display will be produced for each.

If all the faults are cleared, then there will be no potential on the start line and the start circuit RC will no longer provide an output to close the drive gate DG, so that the scanner chain SC will stop. Starting circuit RC now provides a potential on reset line RSL which sets scanner chain SC into its "zero" condition in which none of the alarm gates is set.

Before describing the arrangements by which a particular display is produced it will be convenient to discuss the manner in which a single character is generated.

Each character is made visible to the observer as an apparently linear trace on the screen of a cathode ray tube. To produce this trace the cathode ray tube is fed with pairs of deflection voltages arranged to deflect the beam to each in turn of a plurality of points on the required trace and with bright-up pulses arranged to cause the beam to be produced only when appropriately deflected. To produce appropriate pairs of deflection voltages the apparatus illustrated by the block diagram of FIGURE 2 is employed. Here FPG is a pulse generator providing at individual outputs a cyclic sequence of 32 pulses of equal duration. A ring counter circuit is convenient for this purpose and as various forms of ring counter circuit are known it is not thought to be necessary to offer a full description here.

The deflection voltages for the two directions of deflection conventionally known as the X and Y directions are obtained from corresponding pairs of X and Y resistor chains of which two pairs only are shown in FIGURE 2 at RCXA, RCYA and at RCXE, RCYE respectively. The values of the resistors which form each chain and the pulses which are applied to each point in the chain by way of a connecting field determine the form of the path traced out by the cathode ray beam, while the pulses applied to cause a bright-up circuit to operate and the electron beam to be produced determine which portions of this trace shall be brightened. The brightening of selected portions of a trace is controlled by a connecting field similar to that used for connecting the pulses to the resistance chains.

The arrangements for controlling the production of the letters A, E, F and L are shown in FIGURE 2. The fast pulse generator FPG supplies 32 pulses of equal duration and these pulses are fed to respective lines which are made available at each resistor chain and bright-up gate. Selected pulse lines are connected by way of individual diodes (not shown) to the required points on each resistor chain, or to the input of the bright-up gate as noted in the drawing. The values of the resistors in the respective chains are chosen to produce the required amount of X or Y deflection at each point. The values of the resistors in FIGURE 2 are indicated by like lower-case letters against all resistors of like value. In a particular embodiment of the invention the values employed were as follows:

*a*—470Ω; *b*—680Ω; *c*—1KΩ; *d*—1·2KΩ; *e*—1·66KΩ; *f*—1·8KΩ; *g*—3·3KΩ.

When, for example, the A gates XGA, YGA and BGA, which respectively control the X deflection, Y deflection and bright-up are opened by the application of an appropriate potential to terminal A, then the potentials appearing at the outputs of gates XGA and YGA will vary during the repetition period of the fast-pulse generator as illustrated by the diagrams X DEF and Y DEF, respectively, in the lower part of FIGURE 3, so that the beam will trace out the required form of the letter, as illustrated in the upper part of FIGURE 3, where the dwell positions of the spot during each pulse are shown by the numbered dots. To prevent portions of the trace from varying in brightness the beam is arranged to be produced only during certain pulse periods, as indicated by trace A at the bottom of FIGURE 3. Examination of the diagrams will show that the lines of the required character are traced once only by the brightened beam. Continuity of the trace is ensured by feeding the stepped waveforms appearing at the outputs of the deflection gates to integrator circuits, the output signals from which control the deflection. This part of the system will be further described later in this specification with reference to FIGURE 6.

In certain cases more than one character may be displayed by brightening selected portions only of a trace. Thus as shown in FIGURE 4 the selective brightening of portions only of the E trace will allow characters F and L to be displayed. The deflection waveforms appearing at the outputs of the XGE and YGE gates are illustrated by the X DEF and Y DEF diagrams of FIGURE 4, while the bright-up signals from the three gates BGE, BGF and BGL are shown in diagrams E, F and L respectively. It will be seen from FIGURE 2 that the application of the appropriate gate-opening potential to terminal E, F or L will produce the required display.

As has already been stated, the actuation of any alarm gate as a result of signals from the scanner chain and from the associated delay circuit results in an output which controls the production of an appropriate display. In the present system the display consists of a phrase of up to twelve characters, the production of which is initiated by the application of the output from the alarm gate to an appropriate set of phrase gates.

In order to ensure that the various characters are generated in the correct order and any necessary spaces inserted between them, use is made of arrangements of which a portion is illustrated in FIGURE 5. Here the pulses applied to the resistor chains and bright-up gates for each character are developed by a fast pulse generator FPG which develops cyclically repetitive trains, each of 32 consecutive pulses, which are applied in common to all the X, Y and bright-up connecting fields. In FIGURE 5 only those sets of fields appropriate to the generation of the letters A, R and M are schematically illustrated. XFA, YFA and BFA represent the X, Y and bright-up connecting fields, and in the first two cases the associated resistor chains, for letter "A," XFR, YFR, BFR, those for letter "R" and XFM, YFM, BFM, those for letter "M."

When one of these letters is included in the display required by the actuation of any alarm gate then the master gate associated with that character receives an actuating potential from the appropriate alarm line, of which one only is indicated at ALX in FIGURE 5. Any gates thus actuated are fed at appropriate intervals with one or more pulses developed by a slow pulse generator SPG, which receives a control input from the fast pulse generator FPG once during every cycle of operation of the latter, and which develops a train of 32 consecutive slow pulses of which those appropriate to the required positions of the characters are applied to the master gates MGA, MGR, MGM, through which they can pass to open the respective sets of character gates, such as XGA, YGA, BGA, only when the corresponding alarm line is energized.

The manner in which energization of a particular master gate by a given slow pulse determines the position in the display at which that character appears is further explained below with reference to FIGURE 6. For the present, it is only necessary to understand that energization of the master gates by the slow pulses in the order in which the characters are to appear results in the appropriate deflection control waveforms and bright-up potentials appearing on the three control lines CLX, CLY, CLB which lead respectively to the X integrator, to the Y integrator and to the bright-up circuit, all of which are shown in FIGURE 6.

Here it will be seen that the X integrator XI the output of which is applied to the "X" deflection plates Xa and Xb of a cathode ray tube CRT has two inputs, one input receives potentials applied to it from the CLX or common X line of FIGURE 5 into which passes the output from each character gate as it opens while the other input to the X integrator comes from the X shift field XSF, which is further described below with reference to FIGURE 7. The Y integrator YI, the output of which is applied to the Y deflector plates Ya, Yb of the cathode ray tube CRT, also receives two inputs, one from the common Y line CLY of FIGURE 5 and the other from the Y shift field YSF, which is further described below with reference to FIGURE 8.

Thus the deflection voltages applied to the cathode ray tube each comprise two components, a character forming component received from the portion of the system already described and a shift component which determines the position on the screen of the cathode ray tube at which the character is to be traced.

The production of the beam within the cathode ray tube is controlled by a bright-up circuit BUC containing conventional circuitry by which the beam is caused to be produced from the electron gun EG of cathode ray tube CRT only when the potential of the common bright-up line CLB has the more positive of its two possible values.

The X shift potential fed into the X integrator XI from the X shift field XSF is required to have each in turn of twelve possible values during a period when the Y shift has a first value and to assume each in turn of the central ten of these twelve values during two periods in which the Y shift has second and third values. The shift fields used to produce the necessary stepped waveforms are illustrated in FIGURES 7 and 8 and the resultant waveforms are shown in FIGURE 9.

It will be seen that the shift fields consist of resistor chains to the tapping points of which are applied appropriate ones of the sequence of positive-going slow pulses Q1–Q32 developed by the slow pulse generator SPG of FIGURE 5.

The X shift field shown in FIGURE 7 comprises a chain of eleven equal resistors, designated $j$ each having a value of 1·5KΩ and a resistor designated $k$ of 1·8KΩ together with an n-p-n transistor Tr1 having in its emitter lead an adjustable resistor with a maximum value of 20KΩ. The order in which the slow pulses Q1–Q32 are applied to the tappings of the resistor chain is indicated in FIGURE 7 and the resultant waveform appearing at the output is shown in the Y SHIFT diagram of FIGURE 9.

The Y shift field of FIGURE 8 comprises three series resistors $m$, $n$, $o$ with respective values of 10KΩ, 5·6KΩ and 7·3KΩ. Again the emitter of the n-p-n transistor Tr2 in the collector lead of which the resistors are connected is connected to the negative supply by way of an adjustable resistor having a maximum value of 20KΩ, while in this case the collector is also earthed through a 4·7KΩ resistor designated $p$. The order in which the slow pulses Q1–Q32 are applied to the tapping points of the resistor chain is indicated in FIGURE 8 and the resultant waveform appearing at the output is shown in the Y SHIFT diagram of FIGURE 9.

FIGURE 10 is a schematic representation of the screen of the cathode ray tube CRT showing by rows of squares the positions in which it is possible to display characters by the use of the system described.

The system as thus far described will respond to any reasonable number of alarm signals provided by the closing of appropriate switches by displaying at a selected position on the screen of a cathode ray tube a notice of not more than twelve characters (including spaces).

If more than one alarm switch is closed at the same time, then each notice in turn will be displayed on the tube for a period equal to the three-second dwell time of the stop circuit PC in FIGURE 1.

It is sometimes advantageous to arrange that three notices self-evidently of different degrees of urgency shall be capable of being displayed in apparent simultaneity. To this end the three separate portions of the cathode ray tube screen upon which characters are traced during the three steps of the Y shift voltage may be arranged to luminesce in different colors. Preferably red is chosen for the most urgent warning notices, yellow for those of less urgency and green for notices which are merely advisory. The production of a display cathode ray tube possessing such a tripartite screen offers no special problems and will not be discussed.

In some cases it may be desirable to arrange that a certain class of notices, once displayed and noted may be prevented from appearing in the display unless the defect, once corrected, should recur. For this purpose gating arrangements show in FIGURE 1 may be modified as illustrated in FIGURE 11.

In FIGURE 11 there are shown three alarm switches AS1–AS3, with associated circuits which are basically the same as in FIGURE 1. In this case, however, there is included between the delay circuit D1 and the alarm gate AG1 in channel 1 a recurrence gate RG1 which is used to cause the display of a warning notice to cease. The recurrence gate RG1 is controlled by a potential applied to it by a bistable circuit RB1 operated in the manner now to be described. When the CANCEL button CB is pressed in order to suppress a particular display visible at the time the contacts of the button apply to a cancel gate CG1 a potential that the gate is opened. Cancel gate CG1 when opened allows the output from alarm gate AG1 to pass to bistable circuit RB1, which is set by the output from AG1 into that condition in which it applies to reject gate RG1 a potential which closes this gate to the passage of signals from delay D1 to alarm gate AG1. The output from alarm gate AG1 which as described in relation to FIGURE 5, controls the display of an appropriate legend on the screen of the cathode ray tube, is thus cut off and the display ceases. When the fault condition is cleared and switch AS1 opens, the change in potential which occurs at the output of delay circuit D1, which is applied not only to reject gate RG1 but also to bistable circuit RB1, causes this latter to change its condition, thus opening RG1 to allow the passage of the next alarm signal.

Much of the detailed circuitry employed in the apparatus described above may be conventional. The circuitry employed in some units of FIGURE 1 will now be described in more detail with reference to FIGURE 12, which shows one possible embodiment of these circuits.

In this embodiment the delay circuit D energized by the closure of an alarm switch AS consists of a resistor 1 and a capacitor 2 which is normally charged to a positive potential but which when switch AS is closed is discharged at a rate determined by the relative values of its capacitance and the resistance of resistor 1. In the alarm gate AG, the lead from capacitor 2 of delay circuit D goes to the emitter of a transistor, of which the collector is returned through a load resistor 4 to the positive supply lead (+40V) and the base is connected by way of a limiting resistor 5 to an output of the ring counter which forms the scanner chain SC of FIGURE 1. This counter is arranged in known manner to apply to resistor 5, and hence to the base of transistor 3, for a predetermined period, once during each cycle of operation a potential suitably positive with respect to earth to allow transistor 3 to pass current provided that its emitter is returned to earth by way of resistor 1 and the alarm switch AS. When transistor 3 passes current the potential at its collector changes to a more negative value and this potential is fed out by way of a diode to the stop line PL and also to the appropriate master gates MG of FIGURE 5. Diode 7 serves to ensure that when the alarm switch is open the emitter of transistor 7 is held at the positive supply potential and that therefore it cannot pass any current as a result of the pulses applied to its base from the scanner. When alarm switch AS earths resistor 1 it also establishes a path for current to flow through a diode 8, the start line PL and a transistor 9 in the start circuit RC. The signal arising at the collector of transistor 9 is amplified in a direct-coupled amplifier comprising transistors 10 and 11 and fed out to the drive gate DG of FIGURE 1, which is thus opened to start the scanner chain SC.

When the associated alarm gate transistor is activated by the potential applied to its base from the scanner chain the negative change in potential at its collector passes by way of the stop line PL to the stop gate SG. This consists of a trigger circuit including transistors 12 and 13 coupled by a common emitter-lead resistor 14. The base of transistor 13, to which stop lead PL is connected, is returned to the positive line through a resistor 15 so that in the quiescent condition of the circuit transistor 12 passes current and transistor 13 is cut-off. When the actuation of an alarm gate takes the stop line negative, transistor 12 is cut off and transistor 13 will pass current provided that its base is at an appropriate potential positive with respect to earth. This condition is satisfied only when the bistable circuit BC of FIGURE 1 assumes that one of its conditions in which a drive pulse is applied to the scanner chain. When stop gate SG is thus actuated a negative-going voltage charge appears at the collector of transistor 13 and is fed out to the stop circuit PC, where it passes through a limiting resistor 16 to the base of a transistor 17, the emitter of which is earthed while its collector is returned to the positive supply by way of a load resistor 18. Transistor 17 is thus cut off and the positive-going change in potential appearing at its collector is fed through a limiting resistor 19 to the base of another transistor 20, which is thus caused to pass current. The collector of transistor 20 is returned to the positive supply line through a load resistor 21 and is also connected by way of a capacitor 22 and a diode 23 to the base of a further transistor 24 having its collector connected to the positive supply. When transistor 20 conducts it effectively earths that terminal of capacitor 22 which is connected to its collector so that the potential at the anode of diode 23 is sharply reduced and transistor 23, formerly conductive because its base is returned by way of diode 23 and a resistor 25 to the positive supply, is cut off as is an associated transistor 25 to the base of which the emitter of transistor 24 is connected. The emitter of transistor 25 is earthed and its collector is returned to the positive supply by way of a load resistor 26. When transistors 24, 25 are cut off a positive-going change in potential arises at the collector of transistor 25. An emitter-follower transistor 27 has its base connected to the collector of transistor 25, its collector to the positive supply and its emitter returned to earth by way of a load resistor 28. Thus when transistor 25 is cut off its collector potential changes positively, so that transistor 27 is cut off and a negative-going change in potential appears at its emitter and is fed to the drive gate, thus closing this gate.

This condition persists until capacitor 22 has recharged sufficiently for transistor 24 again to pass current, when transistors 25 and 27 again pass current and the drive gate is opened.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. In display apparatus for providing to an operator indications of faults occurring in an equipment the combination of, a plurality of alarm gates opened to the passage of signals in response to an applied potential, a source of a predetermined initiating potential, an individual alarm switch actuated in response to the occurrence of each said fault condition, each said switch being arranged when actuated to apply said predetermined initiating potential to an associated one of said alarm gates, interrogator means responsive to the actuation of any said alarm switch by applying to each in turn of said alarm gates for a first, shorter period of time a gate-opening potential and to respond to the appearance of said potential at the output of said gate by maintaining said gate-opening potential applied to said gate for a second, longer predetermined period of time, individual means responsive to the appearance of said initiating potential at the output of each said alarm gate for producing sets of control signals in appropriate sequence, a cathode ray tube disposed in the field of view of said operator, control circuits for controlling the production and deflection of the beam of said cathode ray tube in accordance with received signals, and means for applying said sets of control signals to said control circuits, so as to develop on the screen of said cathode ray tube a display indicative of the occurrence of the initiating fault condition.

2. Display apparatus as in claim 1 including a delay circuit interposed between each said alarm switch and said interrogating device to prevent the production of a said display in response to transient closure of a said alarm switch.

3. In a display apparatus indicating to an operator fault conditions occurring in an equipment, the combination of: individual switches each actuated in response to the occurrence of one of said fault conditions from a first condition to a second condition to establish an initiating condition; a cathode ray tube including a luminescent screen, and a control electrode for causing an electron beam of variable intensity to impinge upon said screen; first and second deflection means for controlling displacement of said electron beam in different directions over said screen; a plurality of groups of program generators each including three program generators, each of said generators being repeatedly operable to generate a predetermined program of control signals; individual sets of switch means operable to connect individual generators in each of said groups respectively to said first and second deflection means and to said control electrode; interrogator means operating in response to the establishment of said initiating condition to interrogate each in turn of said individual switches and at each said interrogation to select a set of switch means; said interrogator means responding to interrogation of the one switch actuated to said second condition by causing said selected set of switch means to connect an associated said group of program generators to control the intensity and deflection of said electron beam, thereby causing the development on the screen of said cathode ray tube of at least one symbolic trace indicative of the presence and nature of said fault causing the actuation of said one switch.

4. Display apparatus as in claim 3 in which on the screen of said cathode ray tube major areas are formed of substances luminescing in different colors, and in which some at least of said program generators produce on said screen of said cathode ray tube traces disposed within each of said major areas.

5. Display apparatus as in claim 3 in which on the screen of said cathode ray tube major areas are formed of substances luminescing in different colors separated by demarcation lines which appear horizontal to said operator and in which some at least of said program generators produce on said screen of said cathode ray tube traces disposed within each of said major areas.

6. In display apparatus for providing to an operator indications of faults occurring in an equipment, the combination of a source of a predetermined initiating potential, a plurality of alarm gates, each being opened to the passage of signals by the application of said initiating potential, an individual alarm switch actuated in response to the occurrence of each said fault condition, an alarm gate associated with each said alarm switch, each said alarm gate having signal and control inputs and a signal output, each of said switches being arranged when actuated to apply said predetermined initiating potential to the associated one of said alarm gates, a common starting lead connected by way of individual diodes to the outputs of all said alarm switches, a pulse generator circuit generating a continuous train of drive impulses, a drive gate having signal, control and inhibiting inputs and an output at which signals applied to said input will appear only in the presence of a control signal at said control input and in the absence of a signal at said inhibiting input means for applying said drive impulses to the signal input of said drive gate, a bistable circuit arranged when in one stable condition to provide a stop gate control signal at a control output and in the other stable condition to provide a drive signal at a drive output, means for applying impulses appearing at the output if said drive gate to said bistable circuit, a ring-counter arranged in response to a succession of drive signals to provide control signals at each in turn of a plurality of output terminals, means for applying said drive signal from said bistable circuit to said counter chain, means for applying each of said control signals from said counter chain to the control inputs of individual ones of said alarm gates, a common stop lead connected through individual diodes to the outputs of each said alarm gate, a stop gate having a signal input connected to said stop lead and a control input, means for applying said stop gate control signals from said bistable circuit to said control input of said stop gate, a stop circuit which when activated by a signal applied thereto provides a stop signal of predetermined duration, means for applying signals appearing at the output of said stop gate to activate said stop circuit and means for applying said stop signals to said inhibiting input of said drive gate, individual means responsive to the appearance of said initiating potential at the output of each said alarm gate for producing sets of control signals in appropriate sequence, a cathode ray tube disposed in the field of view of said operator, control circuits for controlling the production and deflection of the electron beam of said cathode ray tube in accordance with applied signals, and individual gate means each controlled by the output from one of said alarm gates and arranged to control the application of one of said sets of control signals to said control circuits, so as to develop on the screen of said cathode ray tube a display indicative of the occurrence of the initiating fault condition.

References Cited by the Examiner
UNITED STATES PATENTS

| | | | |
|---|---|---|---|
| 2,394,196 | 2/1946 | Morgan | 340—212 |
| 2,412,350 | 12/1946 | Morgan | 340—212 |
| 2,504,999 | 4/1950 | McWhirter et al. | 340—147 |
| 2,611,811 | 9/1952 | Yates | 340—212 |
| 2,666,868 | 1/1954 | McMillan | 340—147 |
| 2,850,723 | 9/1958 | McNaney | 340—324 |
| 2,858,475 | 10/1958 | Blake | 340—147 |
| 2,859,431 | 11/1958 | Morris | 340—324 |
| 2,942,251 | 6/1960 | Shanahan | 340—324.1 |
| 3,090,041 | 5/1963 | Dell | 340—324 |
| 3,107,340 | 10/1963 | Silliman et al. | 340—214 |

THOMAS B. HABECKER, *Acting Primary Examiner.*

NEIL C. READ, *Examiner.*

UNITED STATES PATENT OFFICE
CERTIFICATE OF CORRECTION

Patent No. 3,234,534                            February 8, 1966

John Stanley Todman

It is hereby certified that error appears in the above numbered patent requiring correction and that the said Letters Patent should read as corrected below.

In the grant, line 2, for "assignor to Rank-Bush Murphy Limited," read -- assignor, by mesne assignments, to Elliott Brothers (London) Limited, of Lewisham, London, England, a company of Great Britain, --; line 11, for "Rank-Bush Murphy Limited, its successors" read -- Elliott Brothers (London) Limited, its successors --; in the heading to the printed specification, line 4, for "assignor to Rank-Bush Murphy Limited" read -- assignor, by mesne assignments, to Elliott Brothers (London) Limited, Lewisham, London, England, a company of Great Britain --.

Signed and sealed this 20th day of December 1966.

(SEAL)
Attest:

ERNEST W. SWIDER                          EDWARD J. BRENNER
Attesting Officer                        Commissioner of Patents